United States Patent

[11] 3,622,042

| [72] | Inventor | Raymond C. Fischer<br>Hinsdale, Ill. |
|---|---|---|
| [21] | Appl. No. | 2,011 |
| [22] | Filed | Jan. 12, 1970 |
| [45] | Patented | Nov. 23, 1971 |
| [73] | Assignee | International Harvester Company<br>Chicago, Ill. |

[54] PLANTER WITH FLEXIBLE RADIAL SPRING FINGERS FOR SEED SELECTION
6 Claims, 7 Drawing Figs.

[52] U.S. Cl............................................ 221/219,
221/215, 221/265, 221/254, 221/220
[51] Int. Cl............................................ A01c 7/04
[50] Field of Search............................................ 221/219,
215, 217, 241, 265, 254, 220, 277; 222/407 X

[56] References Cited
UNITED STATES PATENTS

| 2,613,850 | 10/1952 | Varco............. | 221/241 X |
| 3,308,774 | 3/1967 | Keeton............ | 221/217 X |
| 290,389 | 12/1883 | Brigham........... | 221/219 |

*Primary Examiner*—Robert B. Reeves
*Assistant Examiner*—James M. Slattery
*Attorney*—Floyd B. Harman

ABSTRACT: A planter seed-selecting device includes a disc rotatably mounted in a housing with a portion of its periphery received in a seed supply, and having mounted on at least one face thereof radially disposed spring fingers the outer ends of which are engageable with cam means in the housing to cause the fingers to yield axially and receive and, when released, hold a seed therebetween and the face of the disc. After a predetermined rotation of the disc another cam in the housing engages and again causes the fingers to yield axially to release the seed.

PATENTED NOV 23 1971 3,622,042

INVENTOR
RAYMOND C. FISCHER

ATT'Y

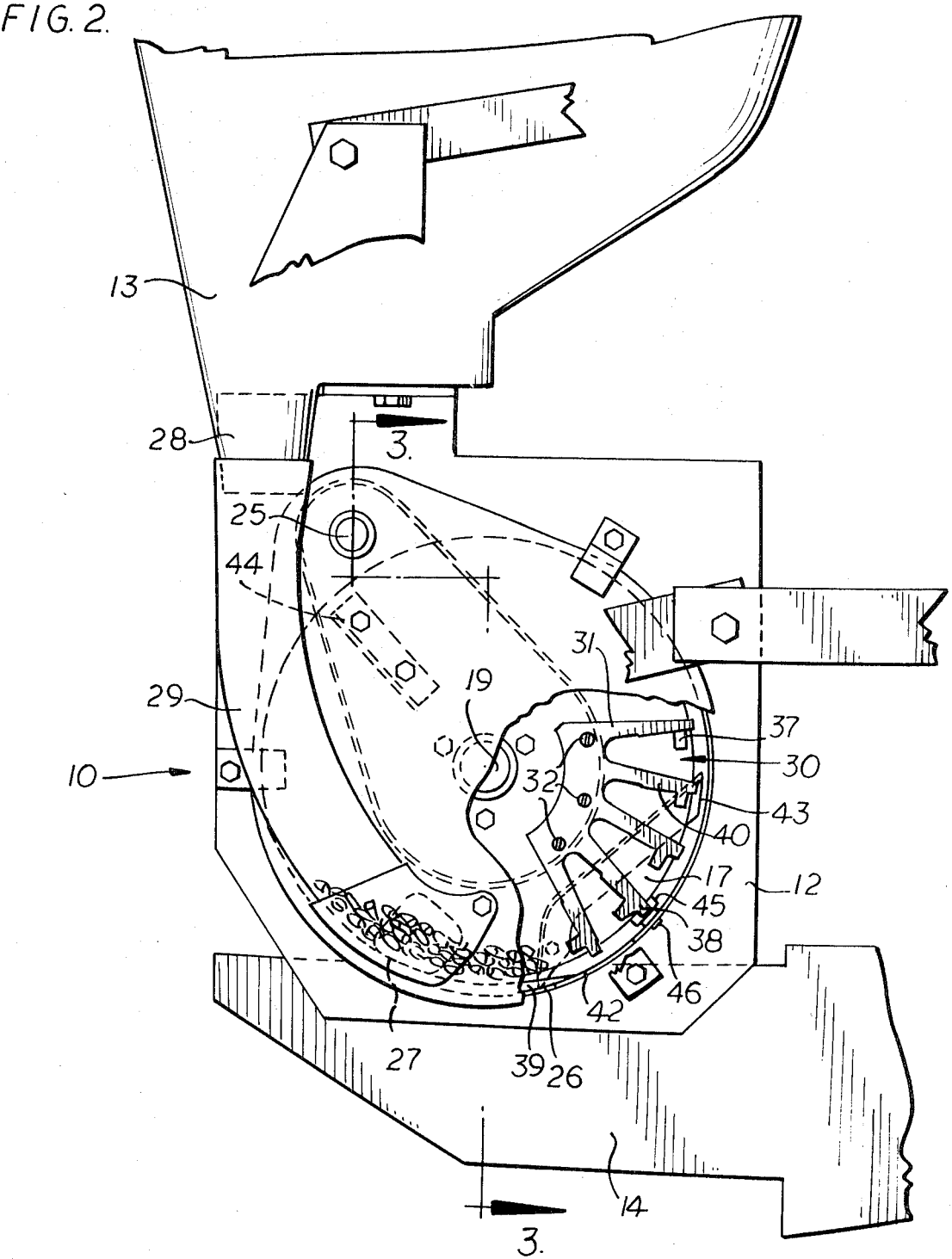

INVENTOR
RAYMOND C. FISCHER

ATT'Y

PLANTER WITH FLEXIBLE RADIAL SPRING FINGERS FOR SEED SELECTION

BACKGROUND OF THE INVENTION

This invention relates to planters and particularly to novel seed-selecting mechanism for planting seed without regard to variations in size thereof. The desirability of providing metering devices capable of selecting and planting ungraded seed and for more accurately dispensing seed at higher planting speeds, is well-known. Conventional seed plate planters are designed for planting seed, for example corn, of uniform size by the use of seed plates having peripheral cells adapted to receive seed of a particular size and shape. In view of the wide variation in seed size, the planter manufacturer must be able to supply the customer with his choice of a multiplicity of seed plates having a wide variety of cell sizes.

Among devices designed to avoid the multiplication of conventional seed plates and to plant seed of varying size have been so-called pneumatic planter seed wheels or plates utilizing vacuum to pick up seed and deliver it to an outlet where it is discharged by forced air or release of the vacuum. An example of such a device is disclosed in the U.S. Pat. to Winter No. 3,142,274. The U.S. Pat. to Varco Nos. 2,613,850, Fischer 3,348,504, Roberson 3,413,941, and Keeton 3,308,774 disclose the use of mechanical devices for selecting and planting seed irrespective of its size. The present invention has for its object the provision of improved seed selecting and dispensing apparatus for planters, and contemplates the provision of a novel seed wheel comprising a plate rotatably mounted with a portion of its periphery in a seed supply and having spring fingers thereon adapted to grasp a seed and hold it against the plate until an area of seed discharge is reached.

Another object of the invention is the provision of a novel seed selecting device for planters wherein a rotatable plate has radially disposed spring fingers mounted thereon extending toward the periphery of the plate at circumferentially spaced locations, these fingers being axially deflectable away from the plate to receive and hold seed between the end portions of the fingers and the plate and to release the seed after a predetermined rotation of the plate.

DESCRIPTION OF THE DRAWINGS

FIG. 2 is a view in side elevation with parts removed of a portion of the seed planter unit shown in FIG. 1 incorporating the features of this invention;

DESCRIPTION OF THE PREFERRED EMBODIMENT

Figure 1:
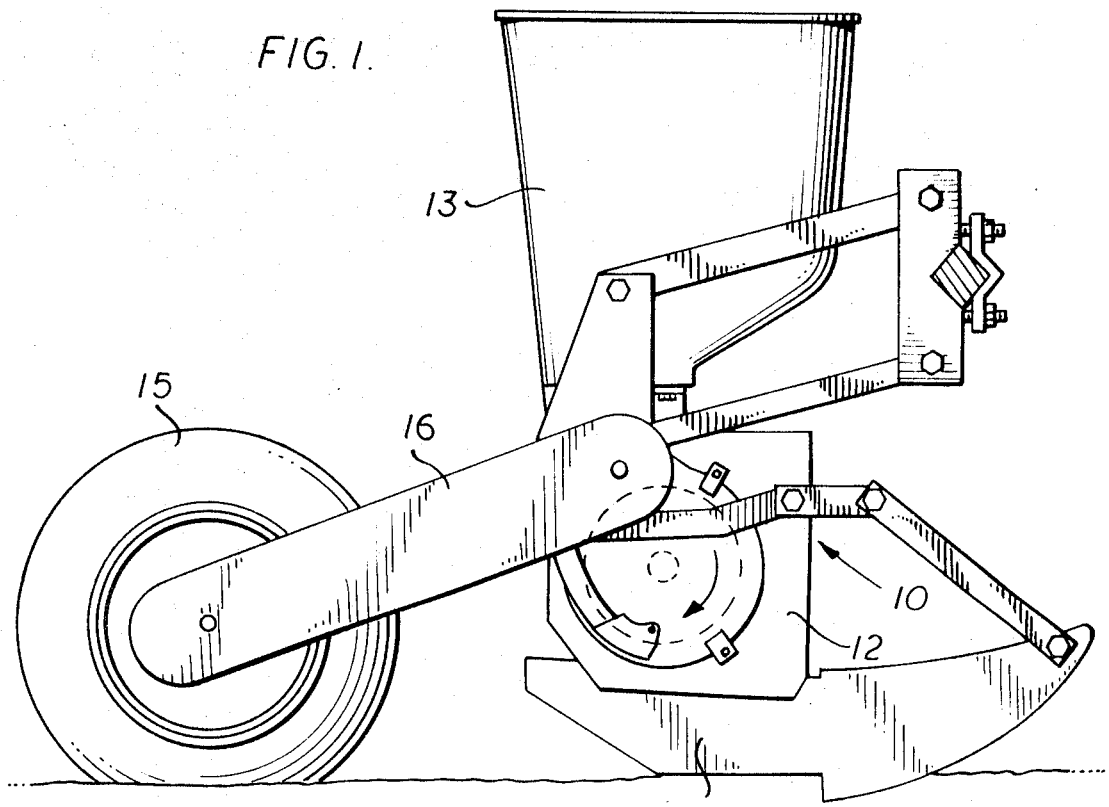
FIG. 1 is a view in side elevation of a seed planter unit incorporating the features of this invention.

In the drawings, the numeral 10 designates a housing forming a part of the supporting framework of the planter mechanism of this invention and including sideplates 11 and 12 supporting a seed hopper 13 at its upper end, and at its lower end a conventional furrow opener 14, press wheel 15, and chain drive means 16.

Figure 3:
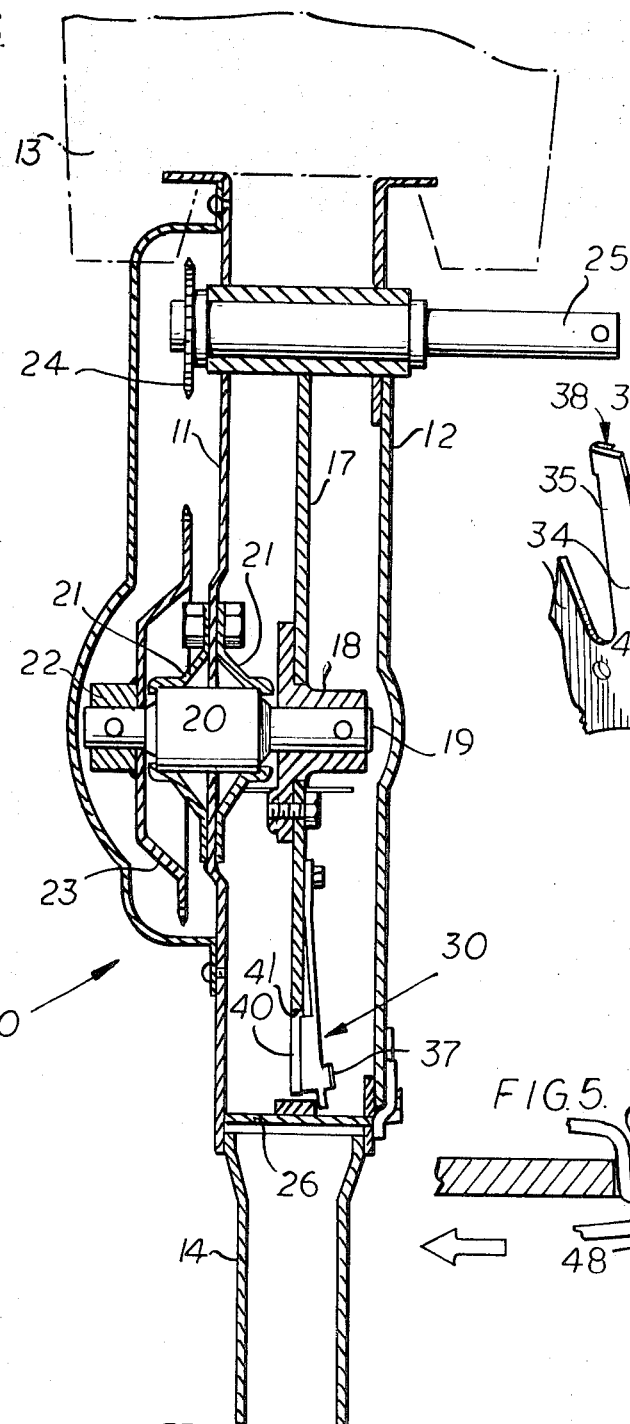
FIG. 3 is a section taken on the line 3—3 of FIG. 2.

As illustrated in FIG. 3, in the housing 10, between furrow opener 14 and hopper 13, a circular plate or disc 17 is secured to a hub 18 affixed to one end of a shaft 19 rotatable in a bearing 20 mounted in retainers 21 carried by wall 11 of the housing 10.

The other end of shaft 20 is secured to the hub 22 of a sprocket wheel 23 drivingly connected to another sprocket wheel 24 mounted on a drive shaft 25 rotatable in suitable bearing means carried by the housing and driven by press wheel 15, through chain drive means 16 drivingly connected to drive shaft 25 to rotate the disc 17 in the direction of the arrow shown in FIG. 1.

As best shown in FIG. 2, the housing 10 has a concentric bottom 26 and seed from hopper 13 is fed into the lower part of the housing through openings 27 in walls 11 and 12 by passing from the hopper through spouts 28 to guide tubes 29, one of which is shown in FIG. 2 to direct seed into the openings 27.

The disc 17 revolves in the seed supply at the lower end of the housing 10 picking up seed in a manner hereinafter to be described and discharging it to the furrow opener 14 after a predetermined rotation of the disc 17.

Figure 6:
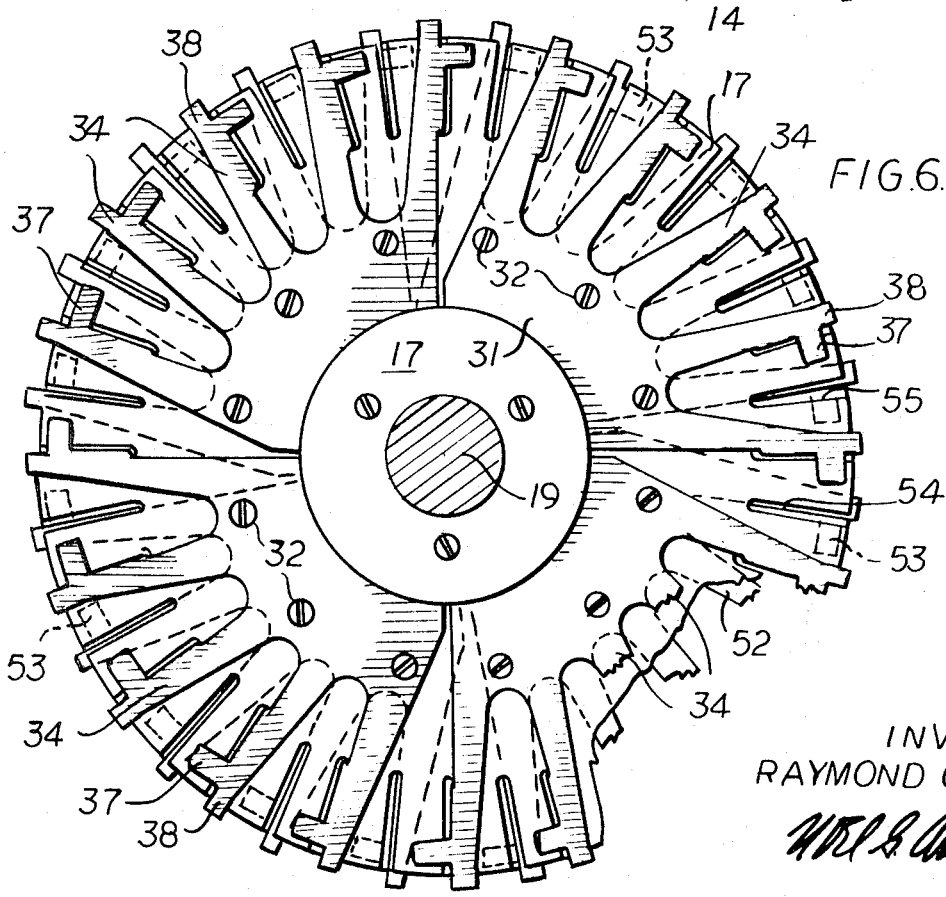
FIG. 6 is a side-elevational view of another modified form of the seed-selecting wheel of this invention wherein seed pickup fingers on one face of the supporting plate or disc alternate circumferentially with seed pickup fingers mounted on the opposite face of the disc.
Figure 7:
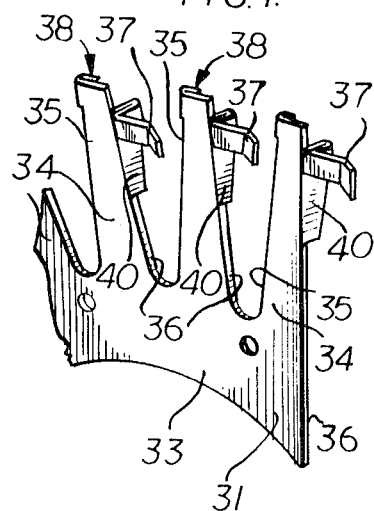
FIG. 7 is an enlarged perspective detail of a portion of the seed selecting mechanism of the invention.

To one face of disc 17 a fingered platelike member 31 is secured by screws indicated at 32, to form with disc 17 the seed wheel 30. As shown in FIG. 7, the platelike member 31 comprises a hub portion 33 and relatively elongated, circumferentially spaced, radially disposed fingers 34, to facilitate replacement, the member 31 preferably comprising a plurality of segments, as indicated in FIG. 6, each being independently replaceable to facilitate repairs.

The segments comprising member 31 are made of spring steel and each of the fingers 34 is deflectable against inherent spring bias away from the supporting disc 17 to receive a seed therebetween and the adjacent face of the disc.

Each of the fingers 34 is provided with a trailing edge 35 and a leading edge 36 with respect to the direction of rotation of the seed wheel, and adjacent the periphery of disc 17 a seed-engaging projection or pad 37 extends from leading edge 36 in the direction of rotation of the seed wheel. The entire finger 34 is axially deflectable and is deflected by engagement of a projection 38, extending radially beyond the periphery of disc 17, with an actuating cam hereinafter referred to.

Figure 4:
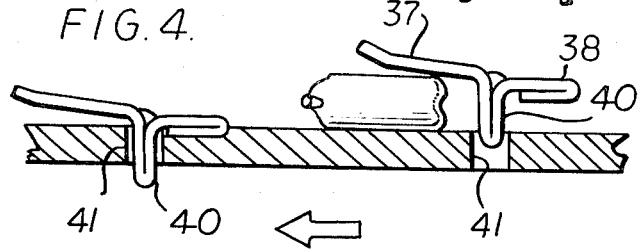
FIG. 4 is an enlarged view of a portion of the seed selecting mechanism shown in FIG. 2.

In order to axially deflect each finger 34 as it passes through the seed supply at the bottom of the housing 10, projections 38 are engageable with the side of an arcuately shaped cam 39 mounted on the bottom plate 26 concentrically with the seed wheel, against the bias of the spring finger, to allow a seed to enter between projection 37 and the face of the disc, in the manner shown in FIG. 4, the seed being retained at the passage of the finger beyond the cam 39, by the bias of the finger toward the face of the disc.

The seed retaining projection 37 is preferably flared as indicated in FIG. 4 and at least one end of cam 39 is tapered so that the exercise of the finger's spring-bias is gradual and the seed is clasped against the disc 17 with minimum likelihood of the seed being prematurely dislodged.

In order to prevent seeds from accumulating under the main portion of the fingers 34, and to assure that the seeds will only be retained by the seed retaining projection 37, the leading edge 36 of each of the spring fingers is provided with an axially extending inwardly directed flange 40 slidably receivable in a slot 41 in disc 17, the flange engaging and brushing the seed aside.

The planting mechanism of this invention is particularly adapted to select and plant corn and other seeds, and as indicated in FIG. 4, each projection 37 is adapted to close upon and retain a single kernel, which projection is carried by the seed wheel 17 in the direction of the arrow shown in FIG. 1 until a point of discharge is reached represented by the outlet 42 shown in FIG. 2 in the base plate 26. Corn discharged through outlet 42 passes between the sideplates of runner 14 and is deposited in the furrow formed by the furrow opener. In order to prevent seed not grasped by fingers 34 and riding with the seed wheel during its rotation, from being discharged with the selected seed held by projections 37, a seed delivery consisting of a 90° angle cross section of rubber or other similar material is provided and designated at 43. One end of diverter 43 is disposed adjacent seed discharge outlet 42 and extends rearwardly with reference to the direction of rotation of the wheel. The diverter 43 is bifurcated to straddle a portion of the seed wheel adjacent outlet 42 and is mounted to the sideplates 11 and 12 projecting inwardly toward the fingers. Further, in order to facilitate its operation and prevent jamming of seed in the housing, the diverter 43 is provided with slits to provide localized flexing. Seed carried around by rotation of seed wheel 30 to the area of discharge, since the rear end of the diverter terminates adjacent the periphery of the wheel, engages the diverter and is deflected back into the supply at the bottom of the housing 10. A similar diverter 44 is located near the top of the housing 10 and acts to dislodge any extra seed that may be partially secured under seed-retaining projection 37, and to keep any free seeds away from the discharge area and return them to the seed supply area.

As is clearly indicated in FIG. 4, the angle that the seed-receiving projection 37 makes with respect to the base plate or disc 17 remains substantially the same throughout the range of axial deflection of the finger by cam 39, facilitating reception and retention of the seed.

Seed is dislodged from each finger by engagement of the cam pad or radial extension 38 of the finger by another cam preferably in the form of a roller of any suitable form and size indicated at 45 mounted on a pin 46 carried by the base plate 26 near the receding edge of discharge outlet 42, the cam roller 45 being adapted to engage the extension pad 38 to again deflect the finger axially and release the seed held by projection 37. Seed so discharged passes through outlet 42 into the furrow.

Figure 5:
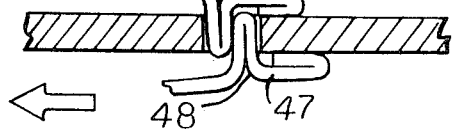
FIG. 5 is an enlarged view of a portion of a modified form of the seed-selecting wheel of this invention utilized in hill dropping.

The seed wheel 30 shown in FIGS. 2 and 3 discloses a segmented plate member 31 mounted on only one side of disc 17 for selecting and releasing a single seed for drilling at regularly spaced intervals in the ground. A modified form of the invention indicated in FIG. 5 provides a duplicate of the spring-fingered plate member 31 on the opposite face of the disc 17 having fingers 47 provided with axial flanges 48 adapted for sliding reception in somewhat larger slots similar to slots 41 to also accommodate the flange 40 of each of the fingers 34. Seeds picked up and held by opposed lateral projections 37 and 49 are dropped simultaneously by the action of cam 45 in deflecting the fingers axially and the two seeds dropped into the furrow form a hill.

FIG. 6 shows another form of the invention in which the number of seeds that may be picked up and released per revolution by a seed plate is doubled. In this case, as in the modification of FIG. 5, like characters represent like parts, and there is shown the division of spring-fingered plate member 31 into a plurality of segments fifty. The platelike member 31 is supplemented by an additional platelike member 51 on the opposite face of disc 17 with the spring fingers 52 thereof circumferentially spaced from and alternating with spring fingers 34 and having seed-receiving projections 53 alternating with the projections 37, and also having flanges 54 receivable in slots 55.

It is believed that the construction and operation of the novel seed selecting and dispensing apparatus of this invention will be clearly understood from the foregoing description.

What is claimed is:

1. A seed-selecting wheel for a planter comprising, a rotatable disc, a series of radially disposed fingers arranged at circumferentially spaced locations about said disc having their inner ends anchored to one face of the disc and axially deflectable to receive and retain a seed between the outer portion thereof and the disc, and an axially extending flange on each of said fingers, said disc having axially directed slots therein slidably receiving said flanges, and another series of fingers having flanges thereon mounted on the other side of said disc opposite and in axial alignment with said first mentioned fingers, the flanges of said other series of fingers being slidably receivable in said slots.

2. A seed-selecting wheel for a planter comprising, a rotatable disc, a series of radially disposed fingers having their inner ends anchored to one face of the disc and axially deflectable to receive and retain a seed between the outer portion thereof and the disc, and an axially extending flange disposed on a portion of the leading edge of each of said fingers to engage and block the entrance of seed between a portion of the fingers and the plate, said disc having axially directed slots therein slidably receiving said flanges, said wheel rotatable in a housing having a seed supply in which at least a portion of the periphery of said wheel is disposed, actuating means being carried by the housing operatively engageable with said fingers such that during rotation of the wheel the fingers are deflected sufficiently to accommodate a seed therebetween and the face of the disc wherein seed is received between each of the fingers and the disc as said fingers pass through said seed supply during rotation of the disc, and whereby during further rotation of said wheel the fingers move out of engagement with said actuating means to yieldably retain the seed between the fingers and the disc, another actuating means being carried by the housing and operatively engageable with said fingers after a predetermined rotation of the wheel to axially deflect said fingers and release said seed.

3. The invention set forth in claim 2, wherein said housing is provided with a first diverter means to dislodge excess seeds received between each of said fingers and said plate and return said seeds to said seed supply and second diverter means disposed within said housing to retain loose seeds within said housing.

4. The invention set forth in claim 1, wherein said seed wheel is rotatably mounted in a housing having a seed supply therein in which a portion of said wheel is rotatable, said fingers having ends projecting radially beyond the periphery of the disc and actuating means is carried by said housing and disposed between said opposed series of fingers and operatively simultaneously engageable with successive of said fingers to deflect them axially away from the faces of said disc to receive and clasp a seed between each of said fingers and the respective faces of said disc.

5. The invention set forth in claim 1, wherein said other series of fingers are mounted on the other face of said disc at circumferentially displaced locations with respect to said first mentioned fingers, additional axially directed slots being provided in said disc to slidably receive the flanges of said other series of fingers.

6. In a planter having a frame including a housing having a seed supply therein, a seed wheel mounted in the housing for rotation on a horizontal axis and having a lower peripheral portion thereof rotatable in said seed supply, said seed wheel comprising a disc, a plurality of radially disposed seed-clasping axially yieldable spring fingers having their inner ends anchored to the disc and their outer ends projecting radially beyond the periphery of the disc, a seed-retaining pad projects from the leading edge of each of said fingers adjacent the periphery of the disc to clasp and hold a seed between the pad and the face of the disc during rotation thereof, a flange on the leading edge of each of said fingers projects therefrom radially inwardly of said projecting pad and radially disposed slits are formed in the disc to receive said flanges during deflection of said fingers to limit the said receiving portion of the fingers to said pad, a cam means mounted in said housing concentric with a portion of said wheel and operatively engageable with the projecting portions of said fingers during rotation of the wheel to axially deflect said fingers to accommodate seed between the outer portion thereof and the face of said disc, said fingers during rotation of the wheel being movable out of engagement with said cam and having a bias toward the face of the disc to hold the seed thereagainst, and another cam means mounted in the housing and operatively engageable with the projecting portions of said fingers after a predetermined rotation of said wheel to deflect said fingers and release the seed.

\* \* \* \* \*